Patented Nov. 5, 1935

2,019,531

UNITED STATES PATENT OFFICE 2,019,531

PROCESS FOR VARNISHING FABRICS, LEATHER, AND THE LIKE

Giacomo Galimberti and Giuseppe Peverelli, Milan, Italy

No Drawing. Application July 28, 1932, Serial No. 625,523. In Italy April 20, 1932

6 Claims. (Cl. 91—68)

The object of the present invention is a chemical process for coating or varnishing, with or without nitro-cellulose, fabrics of any vegetable or animal fibre, including natural leathers, starting from a substratum of macerated rubber or rubber latex, with colouring matter. The said process consists in preparing an emulsion which is applicable as a varnish by itself and which, furthermore, is able to act as a mordant permitting the perfect adhesion of a coating with a nitro-cellulose or like base on a supporting layer formed of a paste of macerated rubber, rubber latex, or rubber dissolved by ordinary well-known solvents, with colouring matter.

Such emulsion is made adhesive in a perfect manner, to the above-mentioned substratum by vulcanizing the fabric, previously coated with the said paste and emulsion. There is thus obtained a product coated with an adhering varnish in a perfect manner and of great resistance.

If it is desired to obtain special effects of light and shade in the whole, there may be applied to such products in addition one or more layers of varnish having a nitro-cellulose or similar base.

The process in such a case differs substantially from the known processes of nitro-cellulose varnishing in that while in the present working of imitation leathers with nitro-cellulose base, there is required in addition to the use of the nitro-cellulose, a corresponding quantity of expensive solvents which are then to a great extent lost, on the contrary with the process according to the present invention a fabric is treated with a latex base which has a price 4 or 5 times lower than that of nitro-cellulose, and does not require the use of solvents; which are thus eliminated almost completely except in the final operation of varnishing in which there is used nitro-cellulose and solvents in small quantities.

In practice the procedure is as follows: The fabric is coated several times according to the weight and thickness which it is desired to obtain, with a paste composed of macerated rubber with colouring material (white lead, colouring matter, minerals, artificial colours precipitated on white lead, china clay, barytes, etc.). To obtain a further considerable economy, instead of the rubber there may be used with great advantage, latex or similar preparations, e. g. "Revertex", having a latex base, which do not require a special solvent but are soluble in water; and to the solution is added the ground colour and if necessary a little solution of casein in ammonia.

For the most part, there is coated on the fabric a paste obtained as follows: One kg. of casein is dissolved in 10 of water, adding ammonia until obtaining tepid a perfect solution which is then macerated with 100 kg. of colour (colouring earth) and there is added 30 to 50 kg. of 75% latex (or a larger quantity if the latex contains a lower percentage of rubber); the more latex there is used the better is the quality of the product, but naturally the price or cost thereof increases, but for ordinary articles it is sufficient to adhere to a low percentage. On the fabric coated in the above described manner, there is then applied the following emulsion, it being understood that the quantities indicated are calculated per 1200 square metres approximately of fabric: 7 kgs. of 75% latex (or in larger proportion if it is a question of a more diluted latex, say 60% or 40%), 9 kgs. of desiccative oil and resin, 1 kg. of casein dissolved in 10 parts of ammoniacal water, 0.5 kg. of 40% formalin, the whole well mixed until obtaining a perfect emulsion. It is then allowed to cool and then there is printed or stamped on the fabric the design or ornamentation which it is desired to obtain. Naturally, the quantity indicated of the various substances composing the said emulsion may be varied more or less, giving rise to a product sufficiently good, but experience has shown that the best results are obtained by adhering to the percentages indicated.

The emulsion made as above described may also, if used as a varnish by itself, be utilized outside the process above mentioned, to a very large extent.

The fabric thus coated with the above described preparation is then vulcanized cold with chloride of sulphur in suitable solvents (benzole, benzine, carbon disulphide, carbon tetrachloride, zylol, etc.).

The percentage of sulphur chloride will depend on the greater or lesser quantity of rubber or latex used in the first coating, but in general it should be calculated as 5 to 15% of the solvent.

This vulcanization serves the double purpose of fixing the preparation and rendering it unalterable, as also fixing the design and giving to the rubber the necessary stability and elasticity.

The fabric is now finished but there may also be subsequently applied a coating of varnish with a nitro-cellulose or similar base such as acetyl cellulose, etc. (and in this case the preparation serves as a perfect mordant), to which may be added the plastic masses commonly used in the ordinary manufacturers of imitation leather fabrics. There may consequently be obtained all the effects which are at present obtained in the usual manufactures of imitation skins, such for example as grained skins, double colour effects, antique imitations, and the like.

The product thus obtained offers the advantage, as compared with those already dealt in and which are made with a nitro-cellulose base, that except in the case of the final layer of varnish, it does not require the use of expensive solvents in the whole of the working; furthermore, it has the great advantage as compared with the quality usually manufactured of being to a large extent stronger, more elastic, flexible, impermeable and without any odour, which last point is of great importance and is not attained in the ordinary manufactures using a base of nitro-cellulose.

In the base according to the above formula, the desiccative oil or rosin may be replaced by a mixture of desiccative oil and any rosin or gum.

The casein may be replaced by an agglutinant having an adhesive property and not coagulating the latex or the "Revertex".

The formalin may be replaced by one or more of its homologues or products having the same chemical function as for example the derivatives of phenol or cresol.

Products analogous to gelatine having for their principal object to prevent the coagulation of the latex or "Revertex" may be added with advantage at any phase of the operation, but precautions must be taken against the occurrence of this phenomenon.

The same may be said regarding the products already known for preserving solutions or materials mixed with casein. Their office of protection against putrification is always accompanied by the property of coagulating the latex or "Revertex", and the use of the substances above mentioned in the products described has for effect to obviate this inconvenience.

The distribution of these products in the mixtures under consideration is such as to obtain the following industrial and economical results:

(a) The goffering of the coating leads to the production of much deeper grains, for such a plastic coating is much better "molded" under the pressure of a cylinder or an engraved plate than an ordinary coating having a rubber base, which is more often too elastic and does not retain the imprint of the goffering in as defined a manner. The plasticity of the coat is increased by the presence in the rubber mixture and in the surface coat of more highly agglutinant substances.

(b) The important reduction in the minimum percentage necessary to be used of fine colours, the substratum being an opaque covering material of neutral colour.

The preparation given by the emulsion as above, is a product intended for the coating or covering, which constitutes at the same time and according to requirements:

(a) Either a protecting varnish on surfaces already covered with a coating having a base of rubber or other plastic material, in which case one of its advantages is to contain among its constituents a common bond and a chemical affinity with the covering material thus employed;

(b) Or a mordant which has for its object to permit the adhesion on this first coating of a fresh supplementary protecting layer or having a different superficial aspect: and then the constituents thereof will confer on the said mordant the same characteristics of softness, plasticity and mechanical resistance already possessed by the support as by the finishing superficial varnish as for example nitro-cellulose which may be applied thereon in its turn.

This, it is understood, after suitable plastification of the cellulose colloid employed as the last varnish.

Any other suitable varnish, for example, dessicative oil or rosin may be also used.

This mordant or varnish may be used according to the formula described with or without the addition of loaders or colours. The loaders may be intended to harden or soften the film. In the first case, such mordant varnish permits of brightening the coloured aspect of the support which it covers.

In the second case, it covers the said support with a neutral or brilliant film perfectly adherent and homogeneous with its support.

The invention is applicable to woods and metals of any kind and to any other substance. It can also be used as an insulator against all electrical magnetic or other effects on wood and metal of any kind and on any other substance.

The object of the invention may also be applied as a strongly adhesive and connecting material between animal or vegetable fibres of any kind or fabrics of animal or vegetable fibre, natural or artificial leathers, wood and metals of any kind or any other substance.

It should also be mentioned that the object of the invention when applied to metals has also the property of preventing oxidation.

It should be noted that the composition of the mordant is such as to give it the following advantages:

1. Of obtaining a perfect adhesion of the cellulosic varnishes on the rubber coatings.

2. Also the adhesion of fatty varnishes, that is to say, having a base of dessicative oil, by adding or otherwise constituents of this oil varnish to the rubber paste.

An example of the application of this latter advantage consists in the possibility of coating a metal with a first coat with a base of dessicative oil, gum, etc., and then causing to adhere on this layer a coating with a rubber base, containing preliminarily, (for example in the latex paste) a percentage of the same dessicative oil in order to obtain a perfect homogeneity.

The final varnish may be preferably constituted by the mordant the formula of which is contained in the present patent.

What I claim and desire to secure by Letters Patent of the United States is:—

1. A process for treating fabric and other fibrous animal or vegetable material, which consists in applying to the fibrous material to be treated a substratum of paste composed of vulcanizable caoutchouc material and coloring matter, also applying upon said substratum a preservative and bonding emulsion composed of latex and a mordant in the form of a vulcanizable oil and resin, and simultaneously vulcanizing together said fibrous material and its applied substratum of paste and the preservative and bonding medium.

2. A process for treating fabric and other fibrous animal or vegetable material, which consists in applying to the fibrous material to be treated a substratum of vulcanizable macerated rubber and coloring matter, also applying upon said substratum a preservative and bonding emulsion composed of latex and a mordant in the form of a vulcanizable oil and a resin, and simultaneously vulcanizing together said fibrous material with the application of the substratum and the preserving and bonding emulsion.

3. A process for treating fabric and other fibrous animal or vegetable material, which consists in applying to the fibrous material to be treated a substratum of paste composed of vulcanizable caoutchouc material and coloring matter, then applying upon said substratum while still undried a preservative and bonding emulsion composed of latex and a mordant in the form of a vulcanizable oil and a resin, simultaneously vulcanizing together said fibrous material said substratum and said bonding emulsion in the cold with a solution of sulphur chloride, and finally applying a coating of resin varnish.

4. A process for treating fabric and other fibrous animal or vegetable material, which consists in applying to the fibrous material to be treated a substratum of paste composed of vulcanizable caoutchouc material and coloring matter, then while said paste is still undried applying upon the same a preservative and bonding emulsion composed of latex, a drying oil and a resin simultaneously vulcanizing together the fibrous material the substratum and the preservative and bonding emulsion in the cold with a solution of sulphur chloride, and finally applying a coating of nitrocellulose.

5. A process for treating fabric and other fibrous animal or vegetable material, which consists in applying to the fibrous material to be treated a substratum of paste composed of vulcanizable caoutchouc material containing a preservative, applying upon said substratum a bonding emulsion composed of latex and a mordant in the form of a vulcanizable oil and a resin, and simultaneously vulcanizing together the fibrous material the substratum and the bonding emulsion in the cold with a solution of sulphur chloride.

6. As an article of manufacture, a fabric or other fibrous animal or vegetable material treated with a paste of vulcanizable caoutchouc material and coloring matter and with a preservative bonding emulsion composed of latex and a mordant in the form of a vulcanizable oil and a resin and uniformly cold cured and bonded throughout by chloride of sulphur and having an outer coating of nitrocellulose.

GIACOMO GALIMBERTI.
GIUSEPPE PEVERELLI.